(No Model.)
J. B. TICHENOR.
SHAFT ATTACHMENT FOR VEHICLES.
No. 464,838. Patented Dec. 8, 1891.
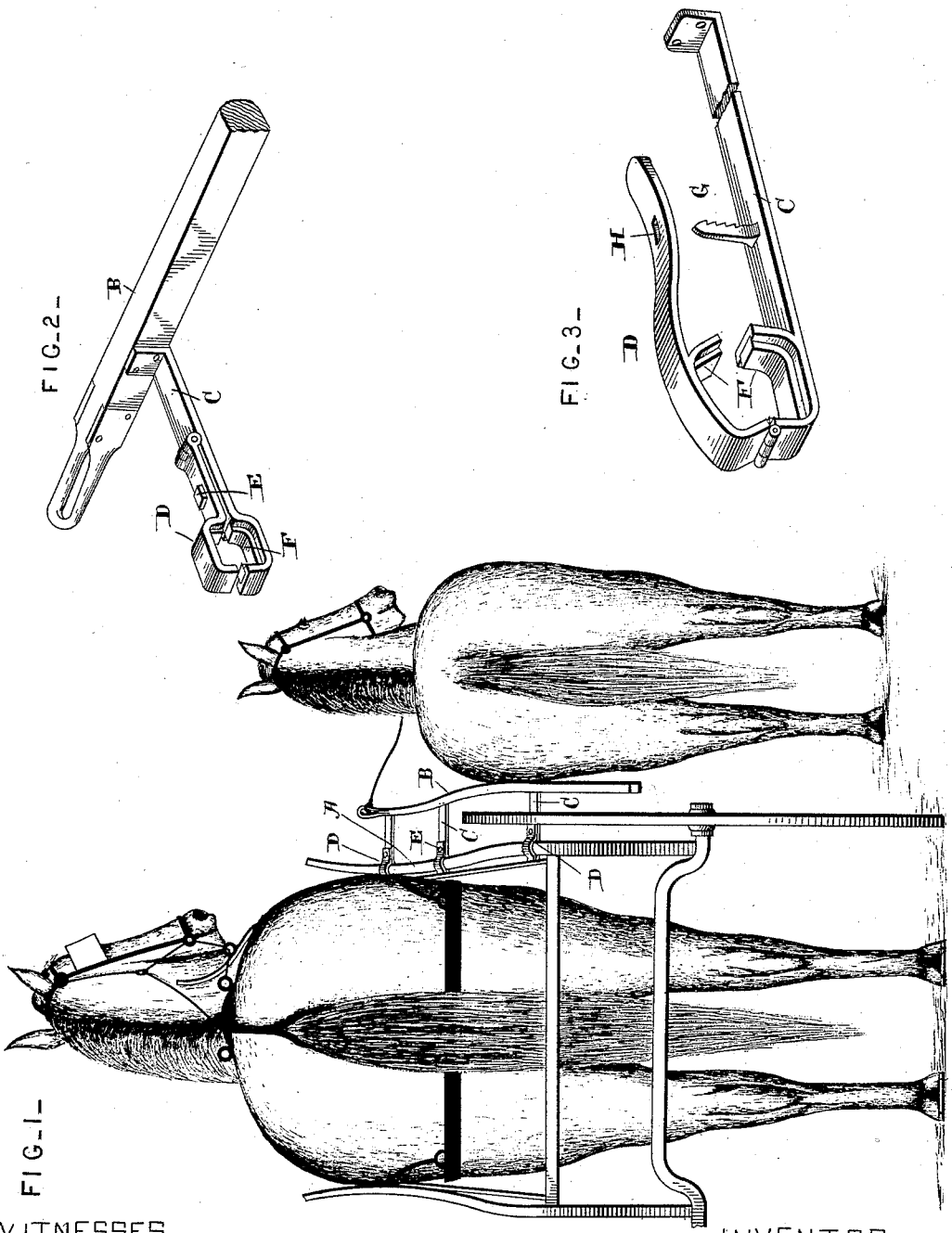
WITNESSES
Geo. E. Frech.
Roland Fitzgerald
INVENTOR
J. B. Tichenor
per Lehmann & Pattison
atty.

UNITED STATES PATENT OFFICE.

JOHN B. TICHENOR, OF CLYDE, OHIO.

SHAFT ATTACHMENT FOR VEHICLES.

SPECIFICATION forming part of Letters Patent No. 464,838, dated December 8, 1891.

Application filed October 10, 1891. Serial No. 408,309. (No model.)

*To all whom it may concern:*

Be it known that I, JOHN B. TICHENOR, of Clyde, in the county of Sandusky and State of Ohio, have invented certain new and useful Improvements in Shaft Attachments; and I do hereby declare the following to be a full, clear, and exact description of the invention, such as will enable others skilled in the art to which it pertains to make and use it, reference being had to the accompanying drawings, which form part of this specification.

My invention relates to an improvement in shaft attachments; and it consists in certain novel features of construction, which will be fully described hereinafter, and more particularly referred to in the claims at the end of the specification.

The object of my invention is to construct an attachment for shafts of vehicles to which a colt may be secured while its mother is drawing the vehicle and which will prevent the colt from crowding too close to its mother and annoying her while at work, and at the same time serving to keep the colt in one position just as though it were hitched to the vehicle. The attachment is also designed for use when it is desired to have an extra horse along with the vehicle, though not hitched thereto, in which case the inconvenience of leading the extra horse or hitching him behind the wagon is done away with.

In many cases it is of advantage to partially break the colt before it is old enough or strong enough to draw a wagon or sulky, in which case he is secured alongside the horse which is drawing the vehicle, which is almost as effectual in breaking him as though he were hitched directly in the shafts.

Referring to the accompanying drawings, Figure 1 is a perspective view of a vehicle provided with my improved attachment. Fig. 2 is a detached view of the attachment. Fig. 3 is a slight modification of the securing-clamps.

A represents the thill of a vehicle, which may be of any preferred construction, and to which the parallel bar B is secured by means of the horizontal arms C. The outer ends of these arms are secured in any desired manner to the bar B, and their inner ends are curved downward to form a seat, which fits the under side of the shaft or thill. Hinged to the upper sides of these arms are the clamping-plates D, the under sides of which are curved upward to fit the upper side of the thill. The hinged plates are secured to the arms C, when clamping the shaft, by bolts E, which securely hold the two together.

The meeting faces of the arms C and plates D are provided with cushions F, of rubber or other material, which are secured within the flanged edges of the said members which prevent them from working out of position.

A modification of the clamping device is shown in Fig. 3, in which plate D is hinged to the extreme inner end of arm C and its free end turned outward over the shaft and secured to the arm C by a pivoted notched catch G, which enters a slot H, formed in the end of the plate D. The notches formed on the said hinged latch catch over the edge of the said slot, holding the arm and plate firmly together. The outer end of the bar B is turned inward, as shown, so as to prevent any possible accident to the colt. The rear end of the said bar extends back beyond the wheel of the vehicle, thus acting as a fender and preventing the colt from coming in contact with said wheel. The colt or extra horse after having been placed in position may be tied or secured to either the thill A or arms C, as may be preferred.

Having thus described my invention, I claim—

1. The combination, with the shaft of a vehicle, of a parallel bar secured thereto, for the purpose herein shown and described.

2. The combination, with the shaft of a vehicle, of a bar secured thereto, having its rear end extended backward, for the purpose shown and described.

3. The combination, with the shaft of a vehicle, of a bar secured thereto, having its rear end extended backward and its front end bent inward, for the purpose shown and described.

4. In a shaft attachment, a shaft, a bar, arms connected at their outer ends to the said bar, and a clamping-plate, the parts being combined substantially as shown and described.

5. In a shaft attachment, a shaft, a bar, arms connected at their outer ends to the said bar and their inner ends curved downward, clamping-plates hinged to the said arms and provided with curved portions which fit the surface of the shaft, and means for holding the said plates and arms together, the parts being combined substantially as shown and described.

6. In a shaft attachment, the shaft, the bar, arms connecting the said shaft and bar and which have their inner ends curved downward, a clamping-plate hinged to the outer end of the said arm, and a pivoted notched catch for securing its free end to the arm, substantially as shown and described.

7. In a shaft attachment, a shaft, a bar parallel therewith, arms C, having curved inner ends, and clamping-plates D, having curved portions which fit the shaft, and cushions secured in the said curved portions, the parts being combined substantially as shown and described.

8. In a shaft attachment, the shaft, a bar, arms C, having curved inner ends, clamping-plates D, having curved portions which fit around the shaft, flanges formed on the edges of the said curved portions, and cushions secured within the said flanges, the parts being combined substantially as shown and described.

In testimony whereof I affix my signature in presence of two witnesses.

JOHN B. TICHENOR.

Witnesses:
J. H. ZENDER,
A. B. FRENCH.